Patented Nov. 24, 1931

1,833,358

UNITED STATES PATENT OFFICE

OTTO ERNST AND HEINRICH LANGE, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

PROCESS OF PREPARING 1,1,2-TRICHLORETHANE

No Drawing. Original application filed September 10, 1928, Serial No. 305,131, and in Germany September 30, 1927. Divided and this application filed December 27, 1929. Serial No. 416,996.

Our present invention relates to a process of preparing 1,1,2-trichlorethane.

Several times attempts have been made to prepare trichlorethane, but no process has hitherto been known giving a satisfactory yield. Only the method of Biltz (cf. "Berichte der deutschen chemischen Gesellschaft" volume 35, page 3527) is worth mentioning. According to Biltz vinyl chloride is used as starting material. In order to avoid substitution, vinyl chloride and an insufficient quantity of chlorine is introduced into chloroform at 0° C., chlorine is then entered until the solution assumes a yellow coloration and the excess of chlorine is subsequently quickly removed by means of caustic soda. After fractionating the product for several times trichlorethane is obtained in a pure state.

Experiments have shown that vinyl chloride behaves towards chlorine in an essentially other manner than ethylene. The addition of chlorine takes place much more difficultly than the case of ethylene, so that the velocity of the substitution as compared with the velocity of the addition is so great as to prevent the formation of trichlorethane in a satisfactory yield and purity by simply combining the gases. The above indicated method of working in a solvent at 0° C. is also no suitable way for preparing the trichlorethane in an easy manner on a technical scale.

This invention is based on the discovery that a mixture of chlorine gas and vinyl chloride does not essentially change in diffused light, but is almost immediately converted into trichlorethane without there being any considerable formation of by-products when exposed to direct sunlight or any suitable artificial source of light. When there is an excess in the gas mixture of about 5 to 10% of vinyl chloride and care is taken that the reaction heat is eliminated by an appropriate arrangement of the apparatus, for instance a cooling device, pure trichlorethane can be obtained in a yield of about 90 to 95 per cent of the theory. Superheating of the reaction chamber to over 80° C. should in this case carefully be avoided since from 90° C. upward substitution again takes place and the gases combine so vigourously that deflagration may occur.

As a result of our research work on the subject we have furthermore found that it is also possible to combine the said two gases in the heat alone without any formation of by-products, by causing a gas mixture of chlorine and vinyl chloride with an excess of about 5 to 10 per cent of vinyl chloride to react with one another at an elevated temperature, say at between 100° C. and 250° C. while carefully excluding all light. The optimum of the temperature is in this case between 140° C. to 150° C. The difference from ethylene is particularly evident from the fact that ethylene reacts with chlorine only at a low temperature without substitution taking place. The trichlorethane can be obtained in a pure state by fractionating it. The yield amounts to 90 to 95 per cent of the theory.

Our invention is illustrated, but not limited, by the following examples:

(1) A mixture of molecular quantities of chlorine gas and vinyl chloride containing an excess of vinyl chloride of 10 per cent is passed before a bulb of 150 watts the temperature being kept at between 52° C. and 56° C. Behind the reaction chamber the chlorine has entirely disappeared from the gas residue which proves to be unaltered vinyl chloride. Thus from 165 g. of chlorine and 146 g. of the reacting vinyl chloride 311 g. of the reaction product are obtained from which 284 g. of trichlorethane can be obtained by fractionation. The yield amounts to 91 per cent calculated upon the converted vinyl chloride.

(2) When carrying out the process as indicated in Example (1), there are obtained from 328 g. of chlorine and 289 g. of the reacting vinyl chloride 614 g. of the reaction product of which 576 g. of trichlorethane are obtained. The yield amounts to 93.5 per cent calculated upon the converted vinyl chloride.

(3) A mixture of molecular quantities of chlorine gas and vinyl chloride with an excess of 10 per cent of vinyl chloride is passed at 148° C. to 153° C. through a tube placed in an oven provided with an air bath, light being carefully excluded within the whole apparatus. After the mixture has left the tube, the chlorine gas is entirely consumed. From 458 g. of chlorine and 405 g. of the reacting vinyl chloride 839 g. of the crude product yielding 905 g. of trichlorethane are obtained. The yield amounts to 93 per cent calculated upon the cenverted vinyl chloride.

This application is a division of our copending U. S. patent application Ser. No. 305,131, filed September 10, 1928.

We claim:

1. The process of preparing 1,1,2-trichlorethane which consists in causing chlorine gas to act upon gaseous vinyl chloride at a temperature of between 100° C. and 250° C., while excluding a solvent and any light.

2. The process of preparing 1,1,2-trichlorethane which consists in causing molecular quantities of chlorine gas to act upon molecular quantities of gaseous vinyl chloride in the presence of an excess of vinyl chloride up to 10 per cent at a temperature of between 100° C. and 250° C., while excluding a solvent and any light.

3. The process of preparing 1,1,2-trichlorethane which consists in causing molecular quantities of chlorine gas to act upon molecular quantities of gaseous vinyl chloride at a temperature of around 150° C. in the presence of an excess of vinyl chloride up to 10 per cent, while excluding a solvent and any light.

In testimony whereof, we affix our signatures.

OTTO ERNST.
HEINRICH LANGE.